United States Patent
Polzin

(10) Patent No.: US 6,527,076 B1
(45) Date of Patent: Mar. 4, 2003

(54) DEVICE AND METHOD FOR LIMITING A BACKWARD ROLLING SPEED OF A MOTOR VEHICLE

(75) Inventor: Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,427

(22) PCT Filed: Apr. 17, 1999

(86) PCT No.: PCT/DE99/01155

§ 371 (c)(1),
(2), (4) Date: May 30, 2000

(87) PCT Pub. No.: WO00/18624

PCT Pub. Date: Apr. 6, 2000

(30) Foreign Application Priority Data

Sep. 29, 1998 (DE) .......................... 198 44 542

(51) Int. Cl.⁷ ...................... B60K 31/00; B60T 8/24
(52) U.S. Cl. ................... 180/170; 180/282; 303/192; 701/79
(58) Field of Search ................. 180/170, 282, 180/285, 271; 303/192; 701/78, 79, 81, 97; 340/440

(56) References Cited

U.S. PATENT DOCUMENTS

| | | | | |
|---|---|---|---|---|
| 4,485,444 A | * | 11/1984 | Maruyama et al. | ........... 701/97 |
| 4,664,218 A | * | 5/1987 | Graham | ...................... 180/272 |
| 4,765,649 A | * | 8/1988 | Ikemoto et al. | ............. 280/707 |
| 5,376,869 A | * | 12/1994 | Konrad | ........................ 318/587 |
| 5,825,284 A | * | 10/1998 | Dunwoody et al. | ......... 340/440 |
| 5,869,943 A | * | 2/1999 | Nakashima et al. | ........ 318/586 |
| 5,890,084 A | * | 3/1999 | Halasz et al. | .................. 701/45 |
| 5,941,614 A | * | 8/1999 | Gallery et al. | .............. 303/192 |
| 5,997,108 A | * | 12/1999 | Claussen et al. | ............. 303/192 |
| 6,002,975 A | * | 12/1999 | Schiffmann et al. | .......... 701/36 |
| 6,086,168 A | * | 7/2000 | Rump | ......................... 303/191 |
| 6,169,946 B1 | * | 1/2001 | Griessbach | .................. 701/45 |

FOREIGN PATENT DOCUMENTS

| | | | |
|---|---|---|---|
| DE | 3147598 | * | 8/1982 |
| DE | 3736807 | * | 11/1989 |
| DE | 3840564 | * | 8/1990 |

* cited by examiner

Primary Examiner—Paul N. Dickson
Assistant Examiner—David R. Dunn
(74) Attorney, Agent, or Firm—Kenyon & Kenyon

(57) ABSTRACT

A device for limiting a rollback speed $v_v$ of a motor vehicle having means for detecting the rollback speed $v_v$ and means for acting upon a brake of the motor vehicle in response to reaching or exceeding a preadjustable limit speed $v_{limit}$, it being possible for the limit speed $v_{limit}$ to be adjusted as a function of a quantity describing a tendency to tilt or a tilting behavior of the motor vehicle.

32 Claims, 2 Drawing Sheets

DEVICE AND METHOD FOR LIMITING A BACKWARD ROLLING SPEED OF A MOTOR VEHICLE

BACKGROUND OF THE INVENTION

In conventional motor vehicles, which usually have a long wheel base, a low center of gravity, and favorable load conditions, there is no risk of a rear rollover in response to an abrupt braking during a backward motion. Recently, however, motor vehicles having a considerably higher center of gravity and a shorter wheel base have come on the market. In the case of such vehicles, rear rollovers can happen in response to an abrupt braking during a backward motion (for example, when starting from rest on a hill).

German patent No. 37 36 807 describes a control device for the braking system of a vehicle, in particular of a commercial vehicle, having at least one master brake cylinder which can be actuated by a brake pedal and acts upon the vehicle brakes at the wheels, and having a drive engine driving the motor vehicle, where a tilt sensor is connected to the control device; in which provision is made for an electronic device allocating a maximum speed to at least one definable value or range of the measured angle of inclination; by which a control signal actuating the vehicle brakes and/or the engine brake can be triggered in response to the exceeding of this maximum speed. This device is used to prevent excessive speeds of commercial vehicles on downhill grades, as a result of which the risk of overloading the brakes can be prevented.

Known from German patent No. 196 37 297 is a road vehicle, where the driving speed, while driving on downhill grade, can be controlled to a predefined setpoint speed by an active, electronically controlled brake intervention, and which is equipped with an antilock braking system and/or a traction control system, only the wheels of the lower vehicle axle being braked during the operation with active brake intervention as long as only a small system deviation between driving speed and setpoint speed or only little tire slip of the braked wheels appears:

Finally, European Patent No. 0 856 446 describes a brake control system, where a brake is applied for decelerating the vehicle to or below the limit speed in response to the exceeding of a limit speed while driving on downhill grade.

The object of the above related art is to prevent the braking system from being overloaded and to ensure as smooth a downhill drive as possible, respectively. The problem of an overturning, particularly of overturning backward, occurring with vehicles having a high-lying center of gravity, is not the subject matter of these printed publications.

SUMMARY OF THE INVENTION

A braking system allowing a rear rollover of a motor vehicle to be prevented effectively.

According to the present invention, the rear rollover hazard appearing with increased frequency in motor vehicles which, due to their concept, have a short wheel base, a high center of gravity and short progressive spring/absorber tunings can be prevented effectively. The device according to the present invention can be implemented in known traction control systems or electronic stability programs (TCS, ESP) without additional outlay of hardware. The active braking torque build-up limits or prevents a backward motion on slopes and ensures that, because of the limited, low vehicular speed, no critical situations, in the extreme case a rear rollover, can occur in response to an abrupt braking during a roll-back motion. By adjusting or ascertaining the limit speed as a function of a quantity describing the tendency to tilt of the motor vehicle, the device or method according to the present invention can be adapted individually to any vehicle types. The tendency to tilt of the motor vehicle can be described, for example, inter alia, by a geometric tilt factor, the height of the center of gravity and the wheel base, i.e., the distance between front and rear axle of the vehicle entering into the tilt factor. In the determination of a geometric tilt factor, moreover; for example, the longitudinal distances between center of gravity and the specific vehicle axles can be allowed for.

In accordance with an advantageous embodiment of the device according to the present invention, the means for detecting the rollback speed are designed as active wheel-speed sensors having direction detection. Sensors of that kind are available in an inexpensive manner and can be used reliably. In the case that a sensory mechanism of that (or another suitable) kind detects a backward motion of the vehicle, a braking torque can be actively built up, for example, via the braking pressure, in at least one wheel brake until the roll-back motion of the vehicle is preferably reduced or stopped. For building up a suitable braking pressure or braking torque, a TCS hydraulics is used preferably. When working with hydraulic systems, the braking pressure can be built up preferably in a pulsed manner for reasons of comfort. In the case of electric systems, it offers itself to increase the braking torque by a slow engagement or increase in current to avoid, in this manner, having to accept an impaired comfort.

The device according to the present invention expediently has means for detecting a gradient of a roadway on which the motor vehicle is located, in particular a tilt sensor, and means for modifying the limit speed as a function of the detected gradient. While allowing for a road gradient in the vehicle's longitudinal direction, a quantity describing the tendency to tilt of the motor vehicle can be detected more accurately, that is to say, in a manner appropriate to a specific situation. While allowing for the vehicle geometry (e.g. distance of rear axle to center of gravity of the vehicle, wheel base, height of the center of gravity of the vehicle) and the road gradient in the vehicle's longitudinal direction, a modified tilt factor can be derived for the motor vehicle. It can be shown that such a tilt factor on level surface (angle of inclination=0) depends solely on the vehicle geometry. A tilt sensor allows detecting, for example, the situation of a hill start so that intentional rollback maneuvers on slight gradients, for example, rolling into parking spaces, can be made possible. In particular, it proves to be advantageous for the permitted limit speed for the roll-back motion to be determined as a function of a detected gradient so that a lower limit speed can be adjusted, for example, in the case of very high gradients.

The device according to the present invention expediently has means for ascertaining a longitudinal acceleration of the motor vehicle and means for modifying the limit speed as a function of the ascertained longitudinal acceleration. While allowing for the vehicle acceleration or deceleration in the vehicle's longitudinal direction, the quantity describing the tendency to tilt of the motor vehicle can be further adapted, thus allowing a limit speed to be determined or adjusted which corresponds to a concrete situation more exactly. The longitudinal acceleration can be determined, for example, by a time derivation of the detected wheel speeds, or by special acceleration sensors (e.g., Hall-effect acceleration sensor).

According to a further embodiment of the present invention, the device has means for preventing or stopping a roll-back motion. Means of that kind are, for example, EMPB systems or hill holder systems. In this context, by EMPB systems one understands electromagnetic parking brakes. Parking brakes of that kind can be actuated by pushing a button, the brake or the braking system being applied in an electrical manner via appropriate actuators.

The device according to the present invention expediently has means for detecting the engagement of a reverse gear and means for modifying the limit speed as a function of the engagement of the reverse gear. If it is detected that a reverse gear is engaged, it can be assumed that a backward motion is intended so that the action of the device according to the present invention can be suspended or modified. As a modification, it is conceivable, for example, to adjust a higher reversing limit speed.

DETAILED DESCRIPTION

Figure 1:
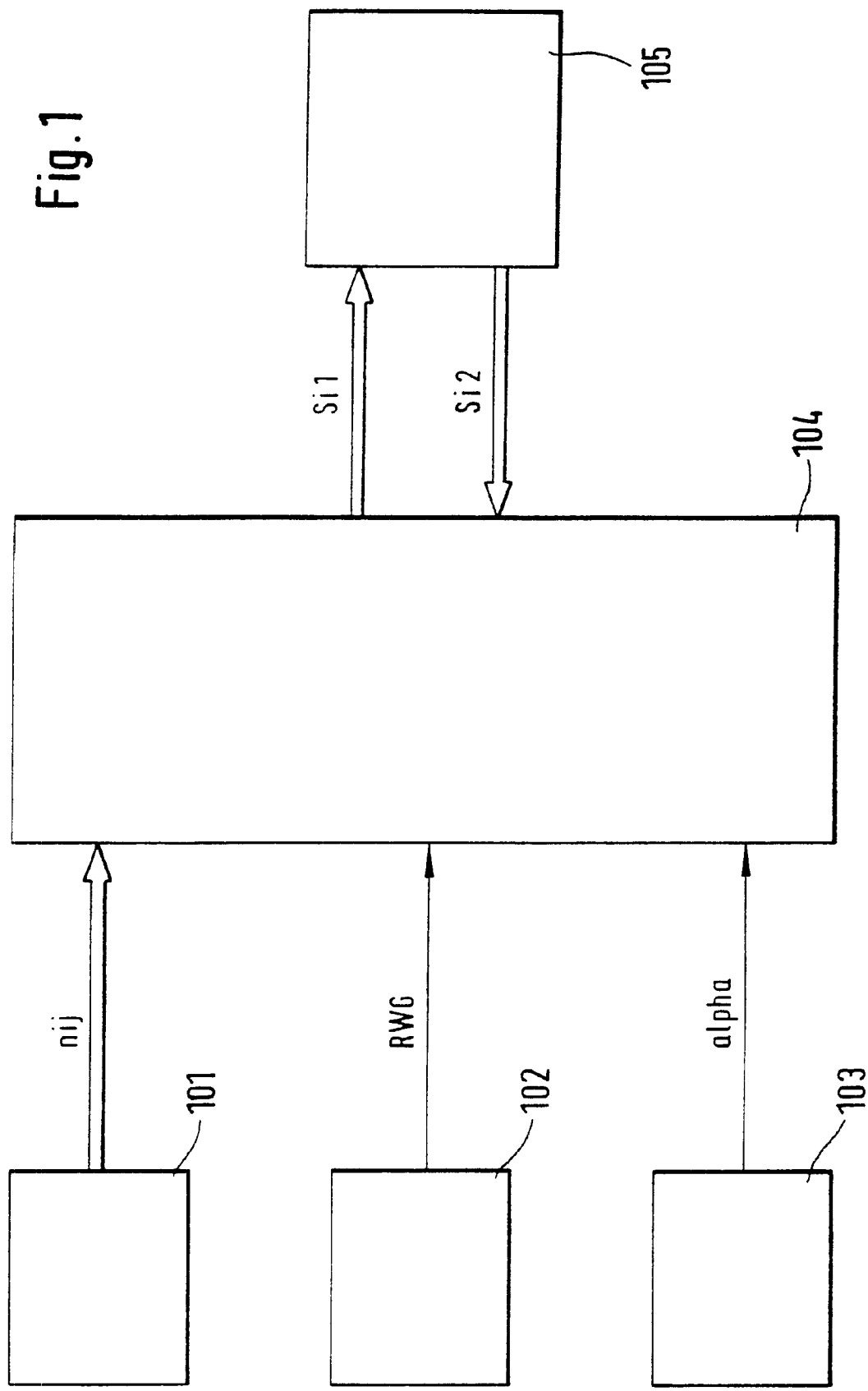
FIG. 1 shows a block diagram of a preferred embodiment of the device according to the present invention.

In FIG. 1, reference numeral 101 designates wheel-speed sensors, the in each case detected wheel speeds being designated with $n_{ij}$. Index i marks the wheel speeds measured at the front or rear wheel; index j marks the wheel speeds measured at the left or right wheel. Moreover, the wheel-speed sensors allow detecting the direction of rotation of the respective wheels or wheel axles.

102 designates means for recognizing or detecting the engagement of the reverse gear. When the reverse gear is engaged, then, for example, a signal RG is assigned value 1 or true; when the reverse gear is not engaged, then signal RG is assigned value false or 0.

103 designates a tilt sensor used for determining the gradient or slope of the roadway in the vehicle's longitudinal direction. In this context, value alpha represents the ascertained value of the road gradient.

Signals $n_{ij}$, RG and alpha are transmitted to a control unit 104. On the basis of the received signals, control unit 104, in turn, outputs signals or quantities $S_i$ for controlling an actuator mechanism 105 used for acting upon a brake of the motor vehicle. Moreover, control unit 104 receives signals or quantities $S_i2$ as feedback from actuator mechanism 105.

Actuator mechanism 105 is able to act upon the brakes of the motor vehicle on the basis of the detected rollback speed and the determinable or adjustable limit speed to prevent a rollover. This is carried out by influencing the valves allocated to the wheel brake cylinders so that braking pressure is built up in the wheel brake cylinders. When traveling with engaged reverse gear (signal RG=1), an engine intervention can be carried out in a supporting manner, as well, for example, by influencing the throttle-valve actuator or by influencing the ignition firing point. These measures result in a reduction of the engine torque.

Figure 2:
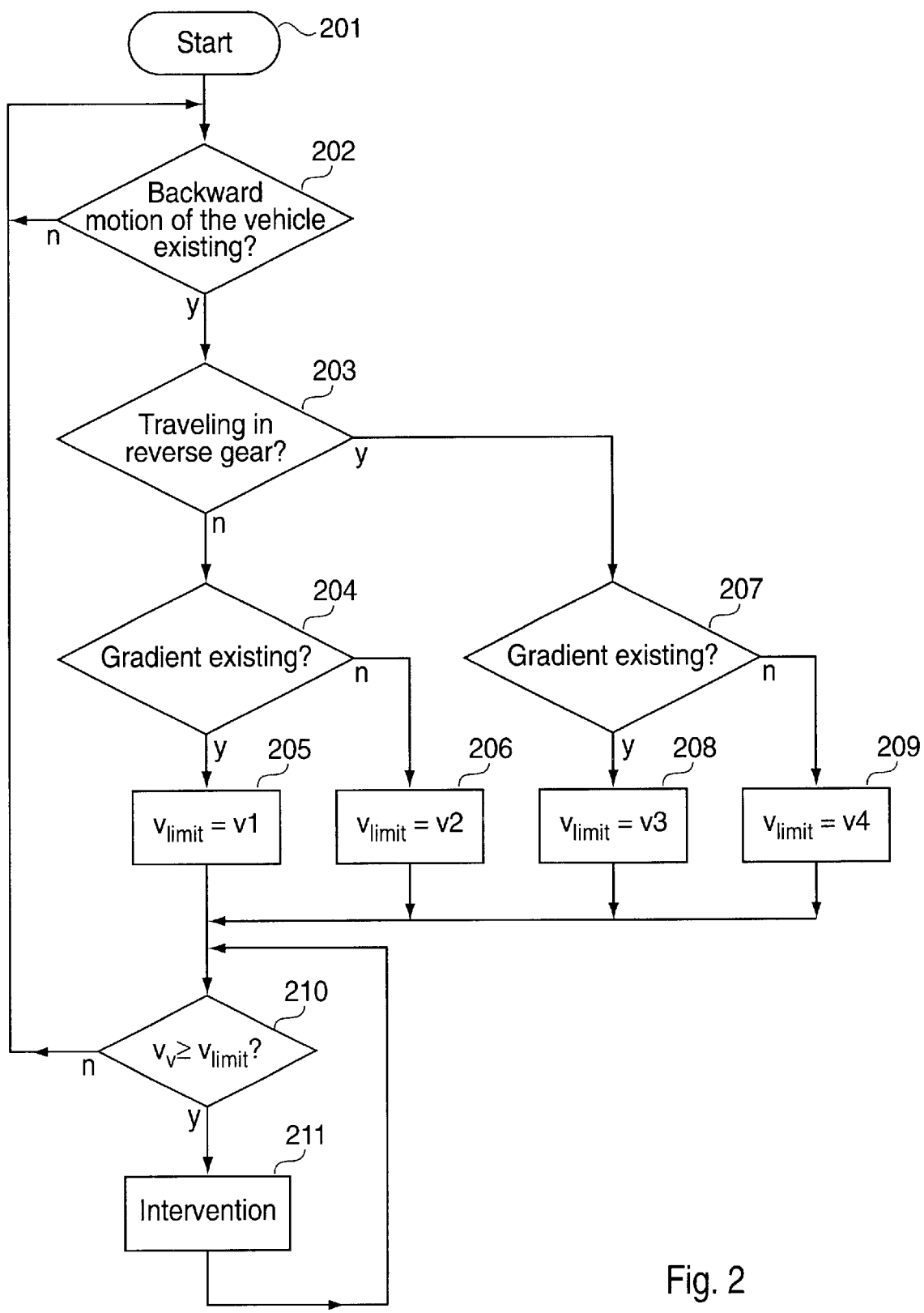
FIG. 2 shows a flow chart to represent a preferred embodiment the method according to the present invention.

With reference to FIG. 2, the method according to the present invention is now described in detail. Step 201 marks the start of the process. In step 202, it is checked whether the vehicle moves backward. This is carried out by evaluating the signals from wheel-speed sensors 101, which permit a detection of the direction of rotation. In the case of a backward motion, this backward motion can be an ordinary rolling back (without torque being transmitted from the engine of the motor vehicle to the driven wheels) or a reverse travel during which engine torque is transmitted to the driven wheels.

In step 203, it is checked whether a travel with engaged reverse gear exists. To this end, signal RG is evaluated. Moreover, it must be detected if the engine delivers a torque to the driven wheels. For that purpose, it offers itself to evaluate a signal which describes the position of the accelerator (for example, a potentiometer as pedal-travel sensor). A sensor of that kind is not depicted separately in the Figures. Alternatively, it is also conceivable to evaluate the torque delivered by the engine, it being possible to carry out such an evaluation in control unit 104. By detecting whether or not a reverse gear is engaged, it is possible to permit limit speeds $v_{limit}$ having different values for these two conditions.

Depending on the presence of a reverse gear, the shown flow chart branches subsequent to step 203. In steps 204 and 207, respectively, it is checked whether the road slopes in the vehicle's longitudinal direction. To this end, signal alpha of tilt sensor 103 can be evaluated. If it is detected that the road has a slope, then correspondingly smaller limit speeds $v_{limit}$ are adjusted or permitted.

Limit speed $v_{limit}$ corresponding to the concrete vehicle situation is assigned in steps 205, 206, 208, or 209. In the normal case, it applies for the shown speeds v1 through v4: v1<v2<v3<v4, i.e., while a gradient exists and the reverse gear is not engaged, a relatively low limit speed v1 is permitted, and a relatively high limit speed v4 is permitted when the reverse gear is engaged and no gradient exists. In the determination of the limit speed the vehicle's longitudinal acceleration which is detected by means for detecting a longitudinal acceleration 101, 104, constituted by the wheel speed sensors 101 and the control unit 104, is expediently allowed for in addition to the factors ascertained in steps 202 through 204.

According to step 210, it is monitored whether the current vehicle speed $v_v$ is higher than or equal to the respective limit speed $v_{limit}$. If it is found that current vehicle speed $v_v \geq v_{limit}$, then a brake intervention is carried out in the manner mentioned earlier, and/or, when traveling with engaged reverse gear, an engine intervention is carried out as described likewise.

In motor vehicles in which no tilt sensor 103 is provided, an evaluation of the road gradient is not possible. Due to this, steps 204 or 205 or the subsequent four-fold distinction of cases can be dispensed with, whereby the computing expenditure in carrying out the method according to the present invention is reduced.

What is claimed is:

1. A device for limiting a rollback speed of a motor vehicle, comprising:
   means for detecting a rollback speed of the vehicle;
   means for presetting a limit speed as a function of a vehicle-dependent geometrical tilting factor describing a tendency of the vehicle to tilt, wherein the tendency of the vehicle to tilt is a quantity describing the tendency for an occurrence of a rear rollover; and
   means for acting upon a brake of the vehicle if the detected rollback speed is as great as the preset limit speed.

2. The device according to claim 1, wherein the means for detecting includes active wheel-speed sensors having direction detection.

3. The device according to claim 1, further comprising:
   means for detecting a gradient of a roadway; and means for modifying the limit speed as a function of the detected gradient.

4. The device according to claim 3, wherein the means for detecting a gradient of a roadway includes a tilt sensor.

5. The device according to claim 1, further comprising:
means for detecting a longitudinal acceleration of the vehicle; and
means for modifying the limit speed as a function of the detected longitudinal acceleration.

6. The device according to claim 1, further comprising means for preventing a roll-back motion.

7. The device according to claim 1, further comprising means for stopping a roll-back motion.

8. The device according to claim 1, further comprising:
means for detecting a setting of a reverse gear; and
means for modifying the limit speed as a function of the detected reverse gear setting.

9. The device according to claim 1, wherein the rear rollover is the vehicle rolling over the rear axle.

10. The device according to claim 1, wherein the geometrical tilting factor is a function of a distance between a front axle of the vehicle and a rear axle of the vehicle.

11. A method for limiting a rollback speed of a motor vehicle, comprising the steps of:
detecting a rollback speed of the vehicle;
ascertaining a rollback limit speed as a function of a vehicle-dependent geometrical tilting factor describing a tendency of the vehicle to tilt, wherein the tendency of the vehicle to tilt is a quantity describing the tendency for an occurrence of a rear rollover;
comparing the detected rollback speed to the ascertained rollback limit speed; and
if the detected rollback speed is at least as great as the ascertained rollback limit speed, acting upon a brake of the vehicle for reducing the rollback speed to at least as low as the rollback limit speed.

12. The method according to claim 11, further comprising the step of adjusting the rollback limit speed while allowing for a current gradient that the vehicle is subjected to.

13. The method according to claim 11, further comprising the step of adjusting the rollback limit speed while allowing for a longitudinal acceleration of the vehicle.

14. The method according to claim 11, further comprising the step of modifying the rollback limit speed if it is detected that a reverse gear of the vehicle is engaged.

15. The method according to claim 11, wherein the rear rollover is the vehicle rolling over the rear axle.

16. The method according to claim 11, wherein the geometrical tilting factor is a function of a distance between a front axle of the vehicle and a rear axle of the vehicle.

17. A device for limiting a rollback speed of a motor vehicle in order to prevent a rear rollover, comprising:
means for detecting a rollback speed of the vehicle;
means for presetting a limit speed as a function of at least one of
(a) a quantity describing a tendency for the occurrence of a rear rollover and
(b) a rear rollover behavior of the vehicle; and
means for acting upon a brake of the vehicle if the detected rollback speed at least equals the preset limit speed.

18. The device according to claim 17, wherein the means for detecting includes active wheel-speed sensors having direction detection.

19. The device according to claim 17, further comprising:
means for detecting a gradient of a roadway; and
means for modifying the limit speed as a function of the detected gradient.

20. The device according to claim 19, wherein the means for detecting a gradient of a roadway includes a tilt sensor.

21. The device according to claim 17, further comprising:
means for detecting a longitudinal acceleration of the vehicle; and
means for modifying the limit speed as a function of the detected longitudinal acceleration.

22. The device according to claim 17, further comprising means for preventing a roll-back motion.

23. The device according to claim 17, further comprising means for stopping a roll-back motion.

24. The device according to claim 17, further comprising:
means for detecting a setting of a reverse gear; and
means for modifying the limit speed as a function of the detected reverse gear setting.

25. A device for limiting a rollback speed of a motor vehicle in order to prevent a rear rollover, comprising:
means for detecting a rollback speed of the vehicle;
means for detecting a longitudinal acceleration of the vehicle;
means for presetting a limit speed as a function of at least one of
(a) a quantity describing a tendency for the occurrence of a rear rollover and
(b) a rear rollover behavior of the vehicle;
means for modifying the limit speed as a function of the detected longitudinal acceleration; and
means for acting upon a brake of the vehicle if the detected rollback speed at least equals the preset limit speed.

26. The device according to claim 25, wherein the means for detecting includes active wheel-speed sensors having direction detection.

27. The device according to claim 25, further comprising:
means for detecting a gradient of a roadway; and
means for modifying the limit speed as a function of the detected gradient.

28. The device according to claim 27, wherein the means for detecting a gradient of a roadway includes a tilt sensor.

29. The device according to claim 25, further comprising:
means for detecting a longitudinal acceleration of the vehicle; and
means for modifying the limit speed as a function of the detected longitudinal acceleration.

30. The device according to claim 25, further comprising means for preventing a roll-back motion.

31. The device according to claim 25, further comprising means for stopping a roll-back motion.

32. The device according to claim 25, further comprising:
means for detecting a setting of a reverse gear; and
means for modifying the limit speed as a function of the detected reverse gear setting.

* * * * *